United States Patent [19]

Kita et al.

[11] Patent Number: 5,229,650
[45] Date of Patent: Jul. 20, 1993

[54] UNITERRUPTIBLE POWER SYSTEM

[75] Inventors: Akira Kita, Otoguni; Tomoki Matsui, Kyoto; Yoshio Kasai, Takatuki; Kenjiro Kishimoto, Kyoto, all of Japan

[73] Assignee: Yuasa Battery Company Limited, Takatsuki, Japan

[21] Appl. No.: 788,512

[22] Filed: Nov. 6, 1991

[30] Foreign Application Priority Data

Nov. 7, 1990 [JP] Japan .................................. 2-303369
Apr. 22, 1991 [JP] Japan .................................. 3-119360

[51] Int. Cl.$^5$ ............................................. H02J 7/02
[52] U.S. Cl. ............................................. 307/66; 307/64; 363/37
[58] Field of Search .................. 363/37; 307/64-66

[56] References Cited

U.S. PATENT DOCUMENTS 4,749,908 6/1988 Stifter ............................. 307/66 X
4,782,241 11/1988 Baker et al. ..................... 307/66

*Primary Examiner*—Emanuel T. Voeltz
*Attorney, Agent, or Firm*—Watson, Cole, Grindle & Watson

[57] ABSTRACT

There is disclosed an improved uninterruptible power system used as a back-up power supply for a computer or communication equipment. The system comprises a rectifier for rectifying AC power from a power line, such as the utility line, an inverter for converting the DC power from the rectifier to AC power, a sealed lead-acid battery connected with the junction of the rectifier and the inverter via a first switch, a charger for supplying charging power from a power line to the battery via a second switch, and a control signal generator. The generator monitors the voltage of a power line and the closed circuit voltage of the battery. Usually, the two switches are opened. In the event of the failure of a power line, the generator closes the first switch to supply the load with electric power. After a power line has been recovered, the second switch is closed to charge the battery via the charger only for a calculated short time.

12 Claims, 2 Drawing Sheets

UNINTERRUPTIBLE POWER SYSTEM

FIELD OF THE INVENTION

The present invention relates to an uninterruptible power system (UPS) and, more particularly, to an uninterruptible power system which is used to back up a computer, communication equipment, or the like and has improved reliability and performance.

BACKGROUND OF THE INVENTION

Usually, the prior art uninterruptible power system supplies AC power from a power line, such as the utility line 1 to a load 4 such as a computer, communication equipment, or the like through a bypass line 10, as shown in FIG. 5. When the utility power fails, DC power from a storage battery 6' is converted into AC power by an inverter 3 and supplied to the load 4. In this way, the load 4 is prevented from causing a trouble in the event of a power failure.

The storage battery 6' of this uninterruptible power system is constantly electrically fully charged with DC power which is obtained by rectifying the AC power from the power line 1 by a rectifier 2. This ensures back-up in the event of an unexpected power failure.

In recent years, such uninterruptible power systems have been required to satisfy various needs such as maintenance free miniaturization, and lower costs. Accordingly, there is a strong tendency that the storage battery 6' is enclosed with higher hermeticity. Also, there is an increasing tendency to mount the components in the system at a higher density. In particular, a sealed lead-acid storage battery 6 has been employed as the storage battery 6'. Components including this lead-acid storage battery 6 have been mounted at a high density within the enclosure.

A positive plate used in the sealed lead-acid battery 6 comprises a grid loaded with lead dioxide that is an active material. The grid is made of a lead alloy. As the battery is electrically charged, the surface of the grid is oxidized and corroded, so that the grid increases in volume. This produces internal stress or deteriorates the strength of the grid.

Therefore, where the uninterruptible power system is used under a floating charge condition, the grid grows as the floating charge continues. As a result, a short-circuit to the negative strap, breakage of the battery container, and leakage of the liquid tend to occur.

Generally, as the charged ampere-hour increases, the growth of the grid increases. For the sealed lead-acid battery 6 in which components are mounted at such a high density, the temperature of the battery tends to rise in particular. Therefore, the charged ampere-hour increases, and the temperature of the battery further rises.

Some systems are equipped with a temperature compensation circuit to lower the floating charge voltage with increasing temperature. The practical procedure is to replace the sealed lead-acid battery 6 every two or three years to maintain the reliability.

SUMMARY OF THE INVENTION

It is an object of the present invention to provide an uninterruptible power system which can maintain high reliability for a long time.

The above object is achieved by an uninterruptible power system set forth in claim 1 which comprises., a rectifier for rectifying AC power from a power line an inverter for converting the DC power from the rectifier to AC power; a sealed lead-acid battery connected with the junction of the rectifier and the inverter via a first switch., a charger for supplying charging power from a power line to the battery via a second switch., and a control signal generator which is capable of monitoring at least the voltage of a power line and the closed circuit voltage of the battery. Normally, the generator opens the first and second switches to supply electric power from a power line to a load either directly or via both rectifier and inverter. In the event of the failure of a power line, the generator closes the first switch to convert the DC power from the battery to AC power by a means of the inverter, for continuing the supply of electric power to the load. After a power line has been recovered, the generator opens the first switch to supply electric power from a power line, closes the second switch to charge the battery via the charger, detects the closed circuit voltage of the battery, and opens the second switch.

The above object is also achieved by an uninterruptible power system set forth in claim 7 which comprises; a rectifier for rectifying AC power from a power line; an inverter for converting the DC power from the rectifier to AC power; a sealed lead-acid battery connected with the junction of the rectifier and the inverter via a switch; and a control signal generator which is capable of monitoring at least the voltage of a power line and the closed circuit voltage of the battery. Normally, the generator opens the switch to supply electric power from a power line to a load either directly or via both rectifier and inverter. In the event of the failure of a power line, the generator closes the switch to convert the DC power from the battery to AC power by means of the inverter, for continuing the supply of electric power to the load. After a power line has been recovered, it supplys electric power to the load and at the same time charges the battery via the rectifier. And the generator detects the closed circuit voltage of the battery, and opens the switch.

The above object is also achieved by uninterruptible power systems set forth in claims 2-5 which are based on claim 1. In the uninterruptible power systems of these claims, the control signal generator is capable of monitoring the open circuit voltage of the sealed lead-acid battery when the second switch is open, the open circuit period between the instant at which the open circuit voltage is started to be monitored and the instant at which the open circuit voltage decreases below a given value, the internal resistance of the battery, and the hysteresis of the temperature of the battery, respectively.

The above object is also achieved by an uninterruptible power system set forth in claim 6 which is based on claim 1, and in which the control signal generator has a display unit and provides a display on the display unit to indicate the timing of the battery replacement either when any one of the monitored values has reached a given value or according to the result of a calculation of a combination of them.

The above object is also achieved by an uninterruptible power system set forth in claims 8-11 which is based on claim 7, and in which the control signal generator is capable of monitoring the open circuit voltage of the sealed lead-acid battery when the switch is open, the open circuit period between the instant at which the open circuit voltage is started to be monitored and the instant at which the open circuit voltage decreases below a given value, the internal resistance of the battery, and the hysteresis of the temperature of the battery, respectively.

The above object is also achieved by an uninterruptible power system set forth in claim 12 which is based on claim 7, and in which the control signal generator has a display unit and provides a display on the display unit to indicate the timing of battery replacement either when any one of the monitored values has reached a given value or according to the result of a calculation of a combination of them.

In the uninterruptible power system of claim 1, the first and second switches are usually open, Electric power is supplied from a power line to the load either directly or via both rectifier and inverter. When the failure of a power line occurs, the first switch is closed so that the DC power from the battery may be converted to AC power by means of the inverter. Thus, the load is supplied with electric power continuously. After a power line has been recovered, the load is supplied with electric power from a power line. At the same time, the second switch is closed to charge the battery via the charger. The closed circuit voltage of the battery is detected, and the second switch is opened. Therefore, the battery is prevented from standing by under the floating charge condition. Consequently, the growth of the grid can be suppressed.

In the uninterruptible power system of claim 7, the switch is usually open. Electric power is supplied to the load either directly or via both rectifier and inverter. When the failure of a power line occurs, the switch is closed so that the DC power from the battery may be converted to AC power by means of the inverter. Thus, the load is supplied with electric power continuously. After a power line has been recovered, the load is supplied with electric power from a power line. Simultaneously, the battery is charged via the rectifier. The closed circuit voltage of the battery is detected, and the switch is opened. Therefore, the battery is prevented from standing by under the floating charge condition. Consequently, the growth of the grid can be suppressed.

The uninterruptible power systems of claims 2-5 are based on claim 1. In claims 2-5, the control signal generator operates to monitor the open circuit voltage of the sealed lead-acid battery when the second switch is open, the open circuit period between the instant at which the open circuit voltage is started to be monitored and the instant at which the open circuit voltage decreases below a given value, the internal resistance of the battery, and the hysteresis of the temperature of the battery, respectively.

The uninterruptible power system of claim 6 is based on claim 1. The control signal generator has a display unit and provides a display on the display unit to indicate the timing of the battery replacement either when any one of the monitored open circuit voltage, the monitored internal resistance, the monitored hysteresis of the temperature, and the monitored value of the open circuit period or according to the result of a calculation of a combination of them.

The uninterruptible power systems of claims 8-11 are based on claim 7. In claims 8-11, the control signal generator operates to monitor the open circuit voltage of the sealed lead-acid battery when the switch is open, the open circuit period between the instant at which the open circuit voltage is started to be monitored and the instant at which the open circuit voltage decreases below a given value, the internal resistance of the battery, and the hysteresis of the temperature of the battery, respectively.

The uninterruptible power system of claim 12 is based on claim 7. The control signal generator has a display unit and provides a display on the display unit to indicate the timing of the battery replacement either when any one of the monitored open circuit voltage, the monitored internal resistance, the monitored hysteresis of the temperature, and the monitored open circuit period has reached a given value or according to the result of a calculation of a combination of them.

The above and other advantages of the invention will become more apparent in the following description and the accompanying drawings in which like numerals refer to like parts.

DETAILED DESCRIPTION OF THE INVENTION

Figure 1:
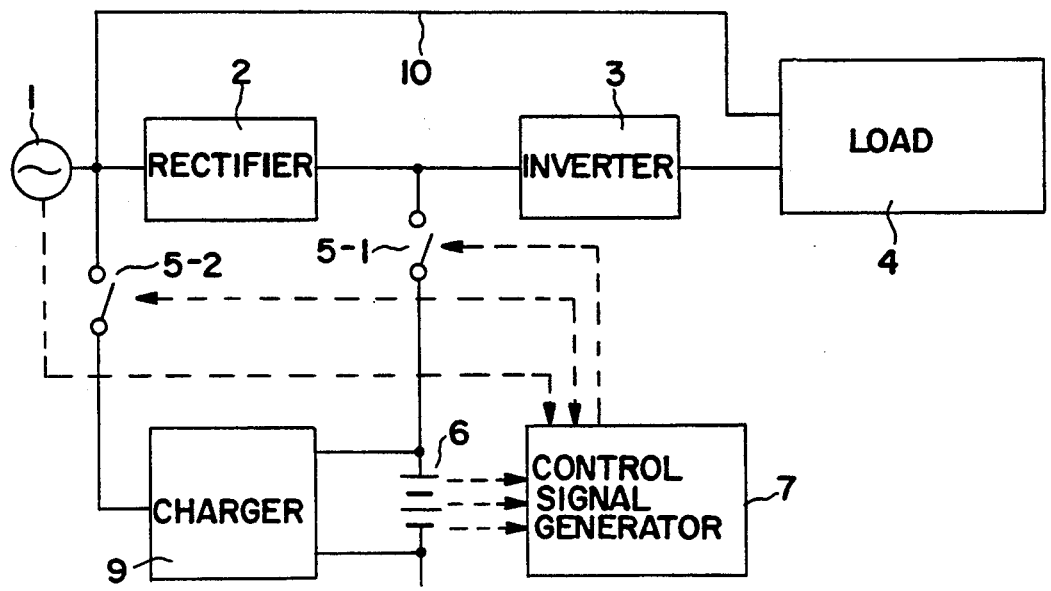
FIG. 1 is a block diagram of an uninterruptible power system according to the invention.

Referring to FIG. 1, there is shown an uninterruptible power system (UPS) embodying the concept of the present invention. This power system comprises a sealed lead-acid battery 6, a rectifier 2, an inverter 3, a first switch 5-1, a second switch 5-2, a charger 9 for charging the battery 6, a bypass line 10, and a control signal generator 7. A power line such as the utility line 1 is connected with the rectifier 2 and also with a load 4. The junction of the rectifier 2 and the inverter 3 is connected with the battery 6 via the first switch 5-1. The utility line 1 is connected with the charger 9 via the second switch 5-2. The control signal generator 7 acts to monitor the voltage of the utility line 1, as well as the open circuit voltage and the closed circuit voltage of the battery 6. Usually, the switches 5-1 and 5-2 are opened by output signals from the control signal generator 7. Under this condition, electric power is supplied from the utility line 1 to the load 4 through the bypass line 10 or through the rectifier 2 and the inverter 3, and the open circuit voltage of the battery 6 is monitored.

If the failure of the utility line 1 is detected by the control signal generator 7, it sends a signal to close the first switch 5-1. In this state, the DC power from the battery 6 is converted into AC power by the inverter 3 to continue the supply of electric power to the load 4.

If it is found that the open circuit voltage of the battery 6 has decreased below 102 V (12.75 V per cell), the control signal generator 7 sends a signal to close the second switch 5-2. Then, the battery 6 is charged by the charger 9. At this time, the closed circuit voltage of the battery 6 is monitored.

If the recovery of the utility line 1 is detected by the control signal generator 7, it sends signals to open the first switch 5-1 and to close the second switch 5-2. The load 4 is started to be supplied with electric power from the utility line 1. At the same time, the sealed lead-acid battery 6 is started to be charged by the charger 9.

When arrival of the closed circuit voltage at a given value is detected, the control signal generator 7 produces a signal to open the second switch 5-2. The open circuit voltage of the battery 6 is restarted to be monitored. The period, or the open circuit period between this instant and the instant at which the open circuit voltage drops below 102 V (12.75 V per cell) is monitored by the signal generator 7. The generator 7 calculates the period during which the second switch 5-2 is closed, from the monitored open circuit voltage. The battery 6 is charged only during the time for which the open circuit voltage is less than the given level. Thereafter, the generator 7 opens the second switch 502. This can prevent the battery 6 from continuing charge excessively.

Figure 5:
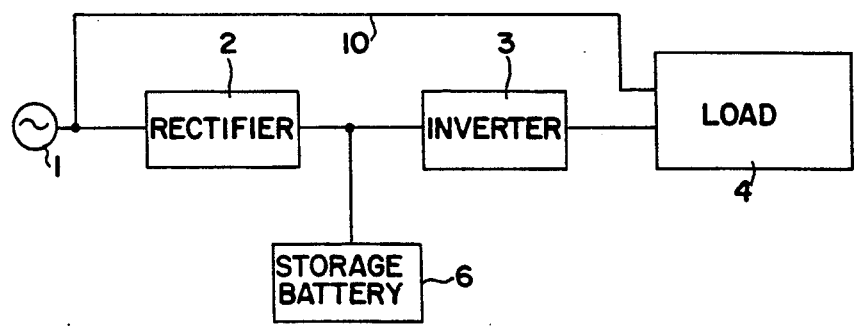
FIG. 5 is a block diagram of the prior art uninterruptible power system.

The above-described uninterruptible power system (UPS) according to the invention is indicated by A. The prior art uninterruptible power system (UPS) shown in FIG. 5 is indicated by B. These two systems A and B were placed in a thermostatic chamber which was maintained at 40° C. A set of life tests for checking the 10-minute rate capacity of the sealed lead-acid battery 6 was performed every 6 months. The results are shown in Table 1 below.

TABLE 1

| months elapsed | UPS A | UPS B |
| --- | --- | --- |
| 0 | 13' 25" | 13' 30" |
| 6 | 12' 46" | 11' 15" |
| 12 | 12' 05" | 10' 56" |
| 18 | 11' 36" | 9' 37" |
| 24 | 11' 18" | 6' 41" |
| 30 | 10' 47" | 2' 12" |
| 36 | 10' 30" | life expired |
| 42 | 10' 11" | |
| 48 | 9' 58" | |
| 54 | 9' 43" | |
| 60 | 8' 51" | |
| 66 | 6' 58" | |

It can be seen from Table 1 that the sealed lead-acid battery 6 of the uninterruptible power system A forming a first embodiment was charged once about every two months during the test of 66 months. During each charging, the battery was charged about 12 Ah. In total, it was charged about 400 Ah. On the other hand, an average current of about 30 mA flowed constantly through the sealed lead-acid battery 6 of the prior art uninterruptible power system B. In total, it was charged about 650 Ah. It was found that the life of the battery 6 of the prior art system B expired after a lapse of 30 months. This proves that the novel uninterruptible power system A maintains high reliability for a long time.

Figure 2:
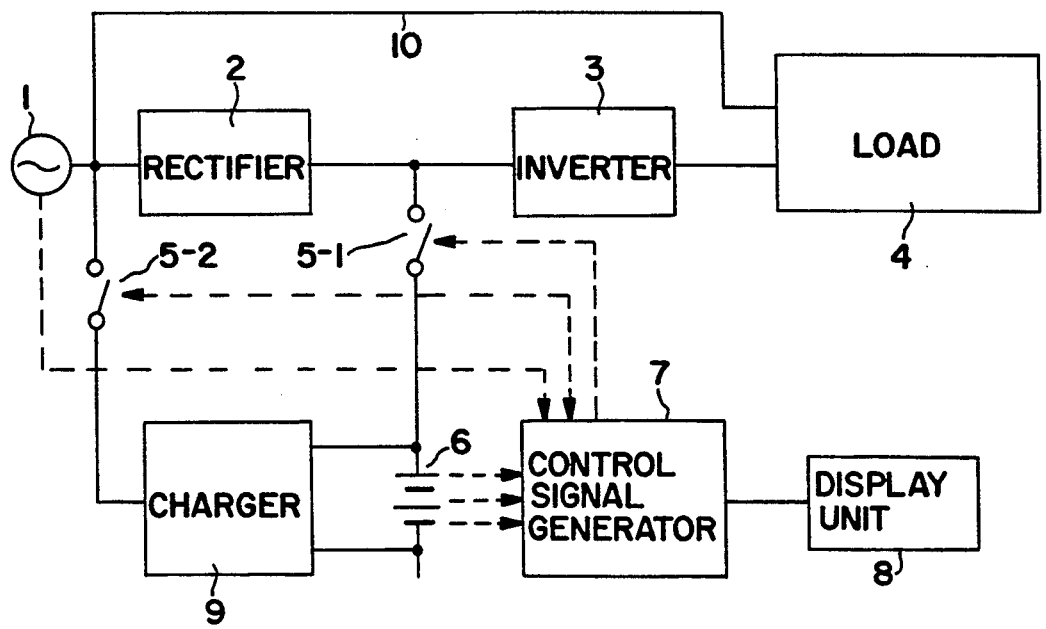
FIG. 2 is a block diagram of another uninterruptible power system according to the invention.

Referring to FIG. 2, there is shown another uninterruptible power system according to the invention. This system is similar to the system already described in connection with FIG. 1 except that a display unit 8 is ancillary to the control signal generator 7. When the open circuit period between the beginning with the instant at which the open circuit voltage is started to be monitored and the ending with the instant at which the open circuit voltage drops below a given value becomes shorter than a certain period, the generator 7 provides a display on the display unit 8 to urge the user to replace the battery 6. Hence, the timing at which the battery 6 must be replaced can be indicated sufficiently prior to the arrival of this timing. That is, as the end of the lifetime is approached, the amount of self-discharge of the battery 6 increases, and the open circuit period shortens. Consequently, the function of indicating the timing of the battery replacement contributes greatly to improvement in the reliability of the uninterruptible power system.

In this embodiment, the control signal generator 7 can be designed to monitor the internal resistance of the sealed lead-acid battery 6. When this internal resistance exceeds a given value, a display can be provided on the display unit 8 to urge the user to replace the battery 6.

It is also possible that the control signal generator 7 can monitor the hysteresis of the temperature of the battery 6. When the temperature is higher than a given value and longer than a certain period, a display urging the user to replace the battery 6 can be presented on the display unit 8.

An appropriate combination of the monitored hysteresis of the temperature, the monitored open circuit period, the monitored internal resistance, and the monitored open circuit voltage may be calculated. The display for indicating the timing of replacement of the sealed lead-acid battery 6 can be provided, depending on the results of the calculation.

Figure 3:
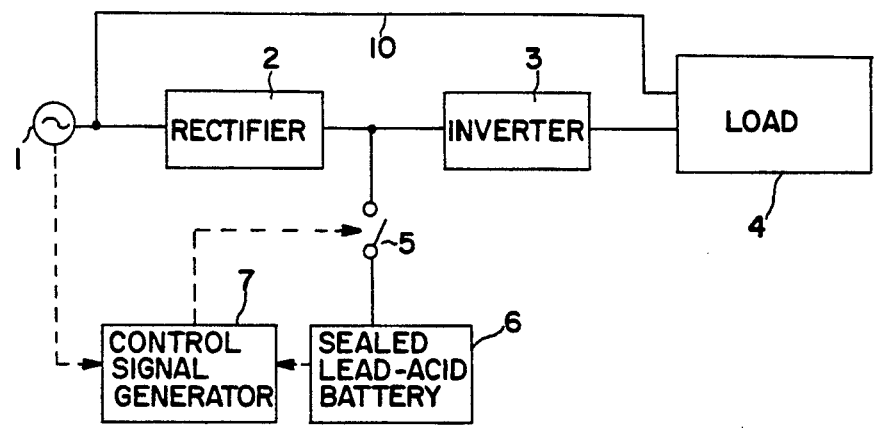
FIG. 3 is a block diagram of a further uninterruptible power system according to the invention.

Referring next to FIG. 3, there is shown a further uninterruptible power system according to the invention. This system is similar to the system described previously in connection with FIG. 1 except that the second switch 5-2 and the charger 9 are omitted and the sealed lead-acid battery 6 is charged with a voltage which is obtained by rectifying the AC power from the utility line 1 by the rectifier 2. The junction of the rectifier 2 and the inverter 3 is connected with the battery 6 via a sole switch 5. The control signal generator 7 monitors the voltage of the utility line 1, the open circuit voltage and the closed circuit voltage of the battery 6. Usually, a signal is produced from the generator 7 to open the switch 5 to supply electric power from the utility line 1 to the load 4 through the bypass line 10 or through the rectifier 2 and inverter 3. The open circuit voltage of the battery 6 is monitored. If the control signal generator 7 either detects the failure of the utility line 1 or senses that the open circuit voltage of the battery 6 has decreased below 102 V (12.75 V per cell), then the generator 7 sands a signal to close the switch 5. In the event of the failure of the utility line 1, the DC power from the battery 6 is converted into AC power by the inverter 3 so that the load 4 may be continued to supply with electric power. If the open circuit voltage decreases below the given value, the battery 6 is charged by the rectifier 2. At this time, the closed circuit voltage of the battery 6 is monitored. After recovery of the utility line 1 has been detected by the control signal generator 7, the utility line 1 restarts to supply electric power to the load 4. Also, the battery 6 is started to be charged. If arrival of the closed circuit voltage at a given value is detected, the control signal generator 7 sends a signal to open the switch 5 so that the open circuit voltage of the battery 6 may be restarted to be monitored. The generator 7 monitors the period, or open circuit period between this instant and the instant at which the open circuit voltage subsequently drops below 102 V (12.75 V per cell). The time for which the switch 5 should be kept closed is calculated from this open circuit period by the generator 7. When the open circuit voltage decreases below the given level, the battery 6 is charged only during this calculated period, after which the switch 5 is opened by the generator 7. In consequency, the battery 6 can be prevented from continuing to charge excessively.

The uninterruptible power system of this third embodiment is indicated by A. The prior art uninterruptible power system shown in FIG. 5 is indicated by B. These two systems A and B were placed in a thermostatic chamber which was maintained at 40° C. A set of life tests for checking the 10-minute rate capacity of the sealed lead-acid battery 6 was performed every 6 months. The results were the same as those listed in Table 1 which were derived from the first embodiment.

It can be seen from Table 1 that the sealed lead-acid battery 6 of the uninterruptible power system A forming a first embodiment was charged once about every two months during the test of 66 months. During each charging, the battery was charged about 12 Ah. In total, it was charged about 400 Ah. On the other hand, an average current of about 30 mA flowed constantly through the sealed lead-acid battery 6 of the prior art uninterruptible power system B. In total, it was charged about 650 Ah. It was found that the life of the battery 6 of the prior art system B expired after a lapse of 30 months. This broves that the novel uninterruptible power system A maintains high reliability for a long time.

Figure 4:
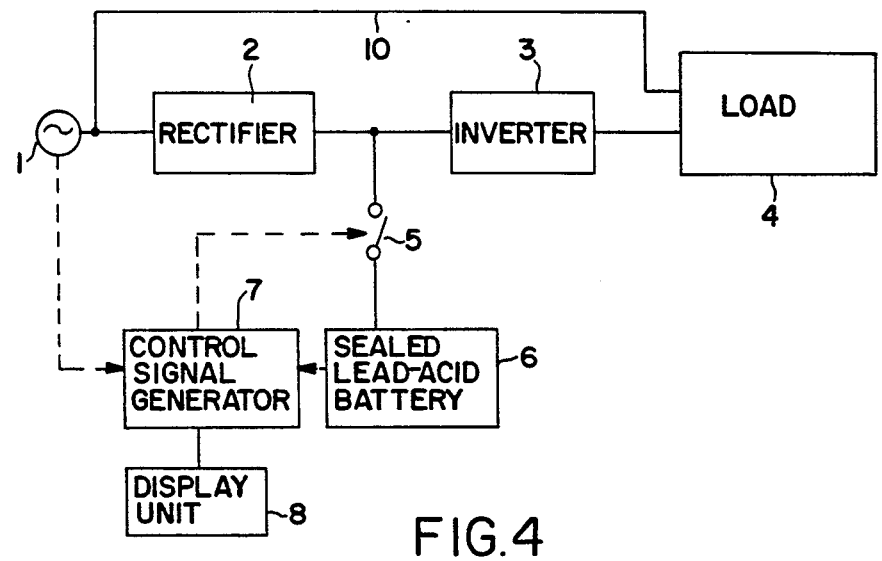
FIG. 4 is a block diagram of a yet other uninterruptible power system according to the invention.

Referring to FIG. 4, there is shown a yet other uninterruptible power system according to the invention. This system is similar to the system described just above in connection with FIG. 3 except that a display unit 8 is ancillary to the control signal generator 7. When the open circuit period between the beginning with the instant at which the open circuit voltage is started to be monitored and the ending with the instant at which the open circuit voltage drops below a given value becomes shorter than a certain period, the generator 7 provides a display on the display unit 8 to urge the user to replace the battery 6. Hence, the timing at which the battery 6 must be replaced can be indicated sufficiently prior to the arrival of this timing. That is, as the end of the lifetime is approached, the amount of self discharge of the battery 6 increases, and the open circuit period shortens. Consequently, the function of indicating the timing of the battery replacement contributes greatly to improvement in the reliability of the uninterruptible power system.

In this embodiment, the control signal generator 7 can be designed to monitor the internal resistance of the sealed lead-acid battery 6. When this internal resistance exceeds a given value, a display can be provided on the display unit 8 to urge the user to replace the battery 6.

It is also possible that the control signal generator 7 can monitor the hysteresis of the temperature of the battery 6. When the temperature is higher than a given value and longer than a certain period, a display urging the user to replace the battery 6 can be presented on the display unity 8.

An appropriate combination of the monitored hysteresis fo the temperature, the monitored open circuit period, the monitored internal resistance, and the monitored open circuit voltage may be calculated. The display for indicating the timing of replacement of the sealed lead-acid battery 6 can be provided, depending on the results of the calculation.

In the above embodiments, the load is usually supplied with electric power though the bypass line 10. Obviously, the invention can be applied to a system in which the bypass line 10 is used only for back-up in the event of a breakdown of the inverter 3; usually, the load is supplied with electric power through the rectifier 2 and inverter 3.

As described in detail in the above embodiments, the novel uninterruptible power system normally maintains the sealed lead-acid battery in a standby condition, i.e., it is kept open. The open circuit voltage is monitored. When the open circuit voltage drops below a given value, a switch is closed only during the period which is calculated from the open circuit period, to recharge the battery. Hence, premature deterioration of the battery 6 which would be caused by continuance of recharging can be prevented. The control signal generator 7 monitors the open circuit voltage of the battery, the internal resistance, the hysteresis of the temperature, and the closed circuit voltage. Only one of them is used for some of them are used in combination to display the timing of the battery replacement on the display unit. In this way, the reliability of the uninterruptible power system can be enhanced.

What is claimed is:

1. An uninterruptible power system comprising:
   a rectifier for rectifying AC power from a power line;
   an inverter for converting DC power from the rectifier to AC power;
   a sealed lead-acid battery connected to the rectifier and the inverter via a first switch;
   a charger for supplying charging power from the power line to the battery via a second switch; and
   a control signal generator capable of monitoring at least the voltage of the power line and the closed circuit voltage of the battery with the first switch closed and which normally opens the first and second switches to supply electric power from the power line to a load either directly or via both the rectifier and inverter, the control signal generator closing the first switch with failure of the power line to covert the DC power from the battery to AC power by means of the inverter, for continuing the supply of electric power to the load;
   and wherein after recovery of the power line, the control signal generator opens the first switch to supply electric power from the power line, closes the second switch to charge the battery via the charger, detects the closed circuit voltage of the battery, and opens the second switch.

2. The uninterruptible power system of claim 1, wherein the control signal generator is capable of monitoring the open circuit voltage of the sealed lead-acid battery formed when the second switch is open, and wherein when the open circuit voltage decreases below a given value, the control signal generator closes the second switch.

3. The uninterruptible power system of claim 1, wherein the control signal generator monitoring the open circuit period between the instant at which the open circuit voltage of the sealed lead-acid battery formed when the second switch is open is monitored and the instant at which the open circuit voltage decreases below a given value, and wherein the closed time of the second switch is calculated from the open circuit period.

4. The uninterruptible power system of claim 1, wherein the control signal generator monitoring the internal resistance of the sealed lead-acid battery.

5. The uninterruptible power system of claim 1, wherein the control signal generator monitoring the temperature of the sealed lead-acid battery.

6. The uninterruptible power system of claim 1, wherein the control signal generator includes a display unit and provides a display to indicate the need for battery either when any one of the monitored open circuit voltage, the monitored internal resistance, the monitored temperature, and the monitored open circuit period reaches a given value or according to the result of a combination of the monitored values.

7. An uninterruptible power system comprising:
a rectifier for rectifying AC power from a power line;
an inverter for converting DC power from the rectifier to AC power;
a sealed lead-acid battery connected to the rectifier and the inverter via a switch;
a control signal generator capable of monitoring at least the voltage of the power line and the closed circuit voltage of the battery with the first switch closed and which normally opens the switch to supply electric power from the power line to a load either directly or via both the rectifier and inverter, the control signal generator closing the switch with failure of the power line to covert the DC power from the battery to AC power by means of the inverter, for continuing the supply of electric power to the load;
and wherein after recovery of the power line, the control signal generator detects the closed circuit voltage of the battery charged via the rectifier, and opens the switch.

8. The uninterruptible power system of claim 7, wherein the control signal generator monitoring the open circuit voltage of the sealed lead-acid battery formed when the switch is open, and wherein when the open circuit voltage decreases below a given value, the control signal generator closes the switch.

9. The uninterruptible power system of claim 7, wherein the control signal generator monitoring the open circuit period defined as the period between the instant at which the open circuit voltage, formed with the switch open, is started to be monitored and the instant at which the open circuit voltage decreases below a given value, and wherein the time for which the switch should be closed is calculated from the open circuit period.

10. The uninterruptible power system of claim 7, wherein the control signal generator monitoring the internal resistance of the sealed lead-acid battery.

11. The uninterruptible power system of claim 7, wherein the control signal generator monitoring the temperature of the sealed lead-acid battery.

12. The uninterruptible power system of claim 1, wherein the control signal generator includes a display unit and provides a display to indicate the need for battery either when any one of the monitored open circuit voltage, the monitored internal resistance, the monitored temperature, and the monitored open circuit period reaches a given value or according to the result of a combination of the monitored values.

* * * * *